UNITED STATES PATENT OFFICE.

OTTO GERBER, OF WITTEN-ON-THE-RUHR, GERMANY, ASSIGNOR, BY MESNE ASSIGNMENTS, TO THE CHEMICAL FOUNDATION, INC., A CORPORATION OF DELAWARE.

CERAMIC COMPOSITION.

1,336,740. Specification of Letters Patent. Patented Apr. 13, 1920.

No Drawing. Application filed October 27, 1913, Serial No. 797,572. Renewed September 3, 1919. Serial No. 321,465.

*To all whom it may concern:*

Be it known that I, OTTO GERBER, a subject of the German Emperor, and resident of Witten-on-the-Ruhr, Germany, in the Kingdom of Prussia, have invented a new and useful Ceramic Composition, of which the following is a specification.

The object of this invention resides in making use of and turning to profit the pieces of glass, china, and earthenware found in garbage and the like; and my invention consists in manufacturing from said pieces a novel composition of matter by treating them in the manner hereinafter described.

Materials of the kind in question have been employed up to now merely as additional substances to the main composition under treatment, and in small quantities only; in fact, care has been taken to use not too much of said materials in order to prevent impairing the durability of the products.

Matters are changed for the better, however, if the pieces of glass, china and earthenware, are employed in unison. China and earthenware pieces have already been worked up together in certain definite proportions of weight, it is true, but adding glass, too, as is done in the present invention, renders the composition and the products superior, because the texture of the composition becomes such that the products may be polished to a high luster.

In carrying my invention into effect, I grind 100 parts of china pieces, 35 parts of earthenware pieces, and 20 parts of glass pieces either separately or all together, taking care to prevent an admixture of iron during the grinding, and the pulverulent mixture is then further treated in the same manner that wall tiles are treated, by pressing into desired form and baking or firing.

This composition does not need any binder. The glass acts in one way as a binder, but it is used principally to increase the luster of the mass when completed. When burning the tiles in a kiln, the melting glass powder obtained from the glass pieces, as well as from the glazing of the china and the earthenware pieces, promotes the sintering process in a very energetic manner, as the melting point of the glass powder is lower than that of the other materials used.

To produce a high luster upon the products, these latter are first preliminarily polished with aid of iron disks, then re-polished with aid of stone disks, and finally finished with aid of wooden disks. The composition may be molded, of course, also after the wet process, and the products may be glazed, if desired.

Having now described my invention, what I desire to secure by a patent of the United States is:

1. A ceramic article consisting of a pulverulent mixture of glass, china, earthenware molded into desired form and fired, substantially as described.

2. A ceramic article consisting of a mixture of finely ground china, earthenware and glass in substantially the following proportions, viz: 100 parts china, 35 parts earthenware and 20 parts glass; said mixture being pressed and fired, substantially as described.

3. A process for the production of a composition for the manufacture of ceramics, consisting of mixing ground glass, china and earthenware, molding the composition thus produced into briquets, and drying and firing the molded block.

4. The herein described process of manufacturing ceramic articles from refuse or broken ware, which consists in finely grinding pieces of glass, china and earthenware, mixing the ground material to form a composite mass, molding the mass in the desired form, then baking and firing.

In testimony whereof I have signed my name to this specification in the presence of two subscribing witnesses.

OTTO GERBER.

Witnesses:
 OLIVE LEUNIER,
 HANS CAMEIER.